(12) United States Patent
Beckwith et al.

(10) Patent No.: US 9,064,420 B2
(45) Date of Patent: Jun. 23, 2015

(54) AUGMENTED REALITY HEADS UP DISPLAY (HUD) FOR YIELD TO PEDESTRIAN SAFETY CUES

(71) Applicants: Lee Beckwith, Palo Alto, CA (US); Victor Ng-Thow-Hing, Sunnyvale, CA (US)

(72) Inventors: Lee Beckwith, Palo Alto, CA (US); Victor Ng-Thow-Hing, Sunnyvale, CA (US)

(73) Assignee: Honda Motor Co., Ltd., Tokyo (JP)

( * ) Notice: Subject to any disclaimer, the term of this patent is extended or adjusted under 35 U.S.C. 154(b) by 88 days.

(21) Appl. No.: 13/803,288

(22) Filed: Mar. 14, 2013

(65) Prior Publication Data

US 2014/0267398 A1    Sep. 18, 2014

(51) Int. Cl.
| G09G 5/00 | (2006.01) |
| G08G 1/16 | (2006.01) |
| G06T 19/00 | (2011.01) |
| G02B 27/01 | (2006.01) |
| G06K 9/00 | (2006.01) |

(52) U.S. Cl.
CPC ............ *G08G 1/166* (2013.01); *G06T 19/006* (2013.01); *B60R 2300/205* (2013.01); *B60R 2300/305* (2013.01); *B60K 2350/1052* (2013.01); *G06T 2207/30261* (2013.01); *G06K 9/00791* (2013.01); *G06T 2207/30256* (2013.01); *B60K 2350/965* (2013.01); *B60R 2300/308* (2013.01); *B60K 2350/1028* (2013.01); *G02B 27/01* (2013.01); *G02B 2027/014* (2013.01)

(58) Field of Classification Search
CPC ................. B60R 2300/205; B60R 2300/308; B60R 2300/305; G06K 9/00791; B60K 2350/1028; B60K 2350/1052; B60K 2350/965; G06T 19/006; G06T 2207/30256; G06T 2207/30261
USPC .................................. 345/633–634; 348/148
See application file for complete search history.

(56) References Cited

U.S. PATENT DOCUMENTS

| 4,716,458 A | 12/1987 | Heitzman et al. |
| 5,051,735 A | 9/1991 | Furukawa |
| 6,226,389 B1 | 5/2001 | Lemelson et al. |
| 6,624,782 B2 | 9/2003 | Jocoy et al. |
| 7,072,764 B2 | 7/2006 | Donath et al. |
| 7,565,230 B2 | 7/2009 | Gardner et al. |
| 7,574,254 B2 | 8/2009 | Milgramm et al. |
| 7,802,198 B2 | 9/2010 | Obradovich |
| 8,144,076 B2 | 3/2012 | Kakizaki |
| 8,239,015 B2 | 8/2012 | Morikawa et al. |
| 2004/0066376 A1 | 4/2004 | Donath et al. |
| 2006/0055525 A1* | 3/2006 | Kubota et al. .................. 340/461 |

(Continued)

OTHER PUBLICATIONS

U.S. Appl. No. 61/643,792, filed May 7, 2012.*

*Primary Examiner* — Jin-Cheng Wang
(74) *Attorney, Agent, or Firm* — Kegler Brown Hill & Ritter; James J. Pingor (57) ABSTRACT

An augmented reality driver system, device, and method safely guide a vehicle driver to yield to pedestrians. A vehicle navigator determines a turn lane based upon proximity to a vehicle. A target sensor detects a pedestrian entering the turn lane and to determine a crosswalk path across the turn lane. An augmented reality controller three dimensionally maps a forward view including the pedestrian, and spatially overlays an augmented reality display on the volumetric heads up display for a driver of the vehicle by projecting a yielding indication adjacent to the crosswalk path.

20 Claims, 8 Drawing Sheets

(56) References Cited

U.S. PATENT DOCUMENTS

| | | |
|---|---|---|
| 2009/0005961 A1 | 1/2009 | Grabowski et al. |
| 2009/0063047 A1* | 3/2009 | Ono ............................. 701/211 |
| 2010/0055649 A1 | 3/2010 | Takahashi et al. |
| 2010/0156617 A1 | 6/2010 | Nakada et al. |
| 2010/0315215 A1* | 12/2010 | Yuda ............................ 340/435 |
| 2011/0128139 A1* | 6/2011 | Tauchi et al. ................. 340/439 |
| 2012/0089321 A1* | 4/2012 | Jung ............................. 701/301 |
| 2012/0224060 A1* | 9/2012 | Gurevich et al. ............. 348/148 |
| 2012/0235805 A1* | 9/2012 | Nogami et al. ............... 340/441 |
| 2013/0204516 A1* | 8/2013 | Fukamachi, Hideo ....... 701/300 |
| 2013/0293582 A1* | 11/2013 | Ng-Thow-Hing et al. ... 345/633 |
| 2014/0204117 A1* | 7/2014 | Kinnebrew et al. .......... 345/633 |

\* cited by examiner

AUGMENTED REALITY HEADS UP DISPLAY (HUD) FOR YIELD TO PEDESTRIAN SAFETY CUES

BACKGROUND

Most drivers believe they are better than average at driving. In fact, many people routinely behave badly behind the wheel because their behavior goes uncorrected, even though a single mistake can lead to deadly consequences. To help train drivers, generally-known systems provide feedback on driver performance via a voice system. Alternatively, other generally-known systems provide a text display that may distract the driver rather than effectively prompting the driver toward a safe driving behavior.

SUMMARY

The following presents a simplified summary of the disclosure in order to provide a basic understanding of some aspects. This summary is not an extensive overview of the disclosure. It is not intended to identify key/critical elements of the disclosure or to delineate the scope of the disclosure. Its sole purpose is to present some concepts of the disclosure in a simplified form as a prelude to the more detailed description that is presented later.

The disclosure presented and claimed herein, in one aspect thereof, includes systems and methods for safely guiding a vehicle driver to yield to pedestrians by determining a turn lane based upon proximity to a vehicle, detecting the presence or absence of one or more pedestrians entering or present in the turn lane and determining a crosswalk path across the turn lane, three dimensionally mapping a forward view including any pedestrians that are entering or present, and spatially overlaying an augmented reality display on a volumetric heads up display for a driver of the vehicle by projecting a yielding indication adjacent to the crosswalk path.

In another aspect of the subject disclosure, an augmented reality driver system safely guides a vehicle driver to yield to pedestrians. A vehicle navigator determines a turn lane based upon proximity to a vehicle. A target sensor detects the presence or absence of one or more pedestrians entering or present in the turn lane and determines a crosswalk path across the turn lane. An augmented reality controller three dimensionally maps a forward view including any pedestrians that are entering or present, and spatially overlays an augmented reality display on the volumetric heads up display for a driver of the vehicle by projecting a yielding indication adjacent to the crosswalk path.

In yet another aspect thereof, a device safely guides a vehicle driver to yield to pedestrians. A controller, in communication with a volumetric heads up display, has at least one processor that executes software instructions to perform operations including: determining a turn lane based upon proximity to a vehicle, detecting the presence or absence of one or more pedestrians entering or present in the turn lane and determining a crosswalk path across the turn lane, three dimensionally mapping a forward view including any pedestrians that are entering or present, and spatially overlaying an augmented reality display on a volumetric heads up display for a driver of the vehicle by projecting a yielding indication adjacent to the crosswalk path.

To the accomplishment of the foregoing and related ends, certain illustrative aspects of the disclosure are described herein in connection with the following description and the annexed drawings. These aspects are indicative, however, of but a few of the various ways in which the principles of the disclosure can be employed and the subject disclosure is intended to include all such aspects and their equivalents. Other advantages and novel features of the disclosure will become apparent from the following detailed description of the disclosure when considered in conjunction with the drawings.

DETAILED DESCRIPTION

Generally described, this disclosure contributes a proactive strategy for counteracting unsafe driving habits. A driver influence/inference cycle is proposed as a model that describes three levels of perception and behavior while driving. Augmented reality is used to design visual stimuli at the lowest, immediate level of perception and provide visual feedback that positively reinforces higher levels of behavior. Consequently, the issue of safety at all levels of perception and behavior is addressed in order to improve driving over both the short and long-term. This approach of using the three-level model to create driver engagement and learning is illustrated with design concepts using a prototype of a volumetric Heads Up Display (HUD) to present pedestrian yielding guides.

Augmented reality (AR) can change the "rules of the game" of the road, so that the attention of the commuter is changed to one that exhibits both safe/defensive driving as well as a hyper-focused, "flow" state that is rewarding for the driver. In effect, the driving experience is "game-ified", not towards aggression, but mastery of the primary driving task, especially with respect towards safe and considerate driving. This perspective suggests that AR can alter one's view of reality in a very personalized way. For instance, drivers who have a display in fuel-efficient vehicles that measure their gas mileage can be motivated to achieve higher fuel efficiency. This is a small example of how constant feedback, goals, and challenge can create positive engagement on the part of the driver. Visual feedback of AR allows unambiguous notifications in context to the environment. This feedback allows higher-level goals and reinforcement mechanisms to be active while driving.

Since HUDs are an emerging technology, many different approaches can be made in how this technology is used in the car. Without proper attention towards the causes of safety and distraction, some may be tempted to design applications of the HUD for secondary tasks such as calendar lookups or video calls. However, it is important to the safety of road users that a system motivated by solving driver distraction via engagement is introduced first in HUDs. Deploying HUDs toward the purpose of saving lives by transforming the attention of drivers towards the primary task of driving is an approach that takes precedence over adding more secondary task functionality to HUDs. Not only can 3-D augmented reality in the car help drivers maintain safe behavior, but it also has the possibility to positively and significantly transform the relationship between drivers, cars, and everyone who shares the streets.

In an example aspect, yielding for or to pedestrians correctly is a behavior that very few drivers take; yet it often goes uncorrected, to the point where pedestrians are cautious even when they know they have right-of-way. As a safe practice, drivers should completely stop for the entire time pedestrians are in the crosswalk, and not drive through until they have fully crossed. In aspects, a visual aid in accordance with the disclosure can put a barrier of kinetic text in line with the pedestrians' movement, and displays text such as "yielding" until the pedestrians have finished crossing. The text is in the orientation of a barrier to deter drivers from advancing forward too soon. The choice of the wording, e.g., "yielding", can act as a response to the driver's good behavior, rather than blaming the driver for bad behavior or using more commanding, coercive language. In aspects, stars (or other indicia) can appear after successful yielding to provide immediate, in-context feedback on performance, with the possibility to later calculate a driving score. A prototyping environment allowed experimenting with different visualizations to help iterate towards more understandable visual stimuli.

As yet another advantage of the disclosure, the system can be employed by third parties (e.g., insurance companies, driving instructors, DMV (department of motor vehicles), etc.). In one example, insurance rate decreases, or increases, can be offered, or assessed, based upon feedback. In another example, feedback can be used to assess driving ability or as instructional feedback in connection with driving instruction.

The disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the disclosure can be practiced without these specific details. In other instances, well-known structures and devices are shown in block diagram form in order to facilitate describing the disclosure.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 1:
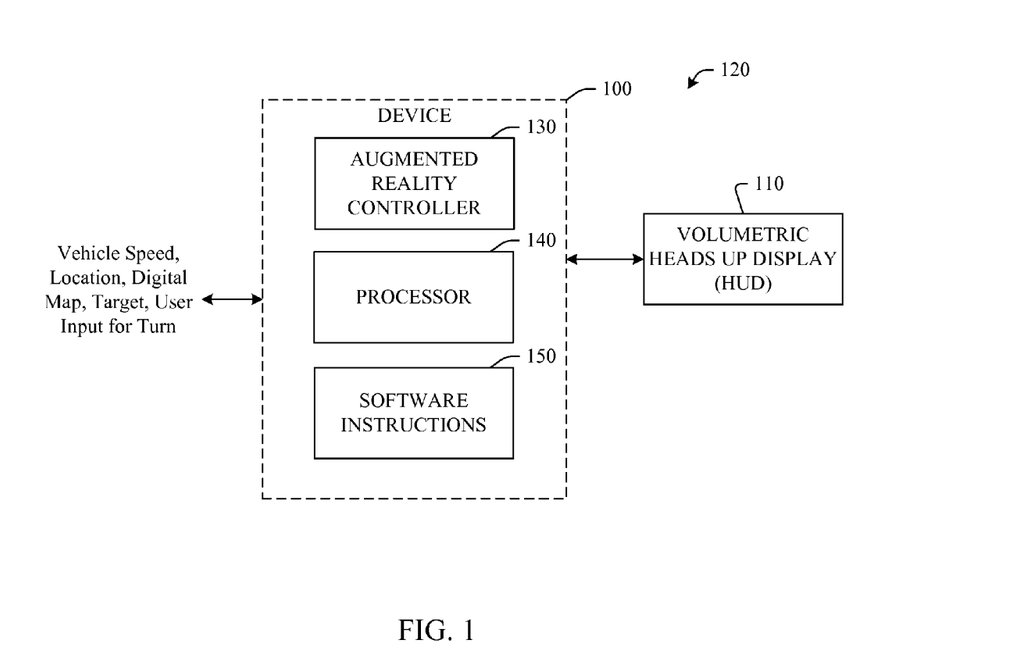
FIG. 1 illustrates a block diagram of a device for using augmented reality to safely guide a driver through a left turn in accordance with an aspect of the disclosure.

Referring initially to the drawings, FIG. 1 illustrates a device 100 for safely guiding a vehicle driver to perform to yield. The device 100 is in communication with a volumetric heads up display (HUD) 110, both of an augmented reality driver system 120. An augmented reality controller ("controller") 130 has at least one processor 140 that executes software instructions 150 to perform operations of:
  determining a turn lane based upon proximity to a vehicle;
  detecting a pedestrian entering the turn lane and determining a crosswalk path across the turn lane;
  three dimensionally mapping a forward view including the pedestrian; and
  spatially overlaying an augmented reality display on a volumetric heads up display for a driver of the vehicle by projecting a yielding indication adjacent to the crosswalk path.

In one illustrative version of the disclosure, the controller 130 can further cause the volumetric HUD 110 to project yielding indication aligned as a barrier to the pedestrian adjacent to the crosswalk path. Alternatively, the controller 130 may detect a building structure adjacent to the pedestrian entering the turn lane, three dimensionally map the building structure in the forward view, and cause the volumetric HUD 110 to overlay the augmented reality display with the yielding indication that is skinned to the building structure.

In one illustrative version of the disclosure, the controller 130 can further perform operations of accessing one or more of a digital map, a location of the vehicle, or a current trajectory of the vehicle, and can receive a user input indicative of a planned turn onto the turn lane. For example, receiving the user input indicative of the planned turn may be by receiving a route map based upon the digital map. Alternatively or in addition, receiving the user input indicative of the planned turn may be by activation of a turn signal.

In one illustrative version of the present disclosure controller 130, can perform operations that include detecting an absence of pedestrians entering or in the crosswalk path, and replacing the yielding indication with a success indication. In aspects, such a success indication can be provided subsequent to detecting that the vehicle has stopped, e.g., in response to the yielding indication.

Figure 2:
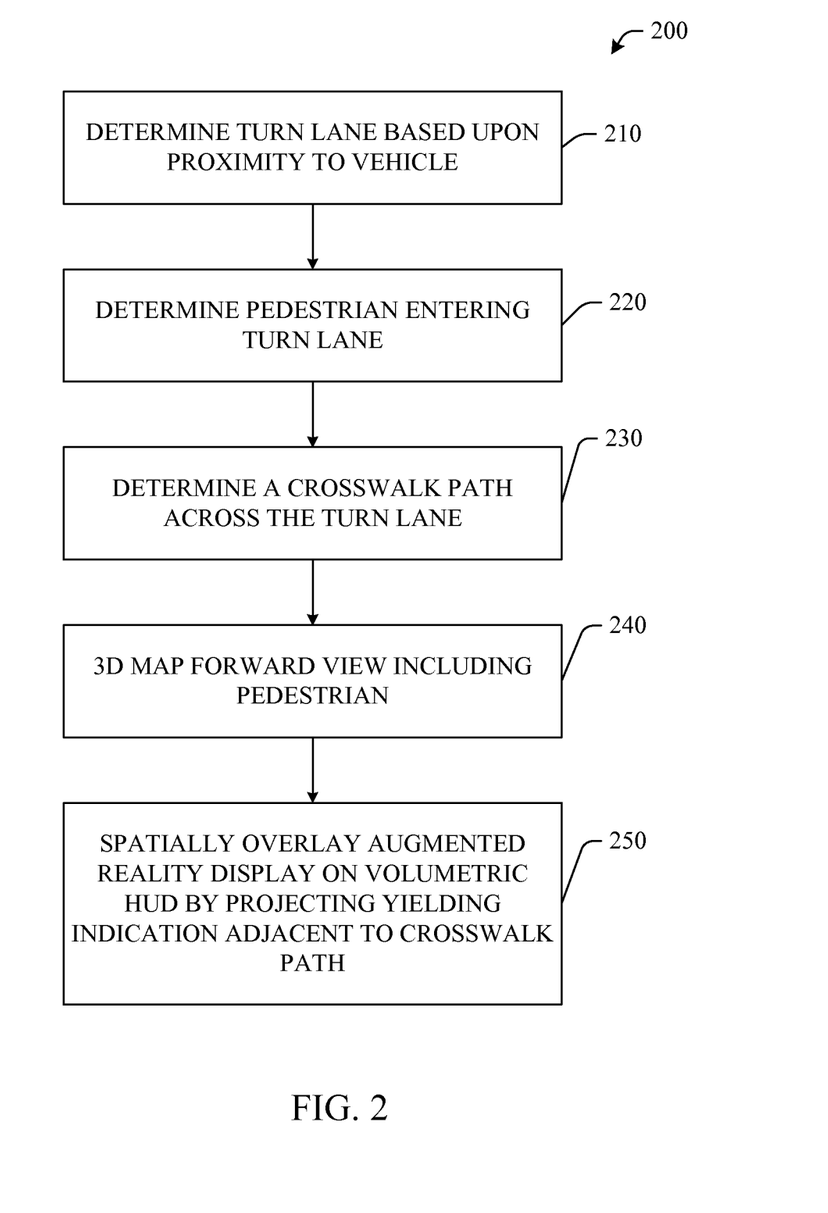
FIG. 2 illustrates an example flow chart of operations that facilitate augmented reality for a safe turn in accordance with an aspect of the disclosure.

FIG. 2 illustrates a methodology of 200 in accordance with an aspect of the disclosure for safely guiding a vehicle driver to yield to a pedestrian. In block 210, a turn lane can be determined based upon proximity to a vehicle. In block 220, a pedestrian can be detected present in or entering the turn lane. In block 230, a crosswalk path for the pedestrian across the turn lane can be determined. In block 240, a forward view including the pedestrian can be three dimensionally mapped. In block 250, an augmented reality display can be spatially overlaid on a volumetric heads up display, e.g., by projecting a yielding indication adjacent to the crosswalk path. While aspects are described with respect to "turning" a vehicle, it is to be understood and appreciated that other aspects can alert and rate a driver's performance in a straight or forward driving path or the like, or in reverse, etc.

According to one aspect of at least one version of the disclosure, the methodology 200 may include projecting yielding indication aligned as a barrier to the pedestrian adjacent to the crosswalk path.

According to another aspect of at least one version of the disclosure, the methodology 200 may include detecting a building structure adjacent to the pedestrian entering the turn lane, three dimensionally mapping the building structure in the forward view, and overlaying the augmented reality display with the yielding indication that can be skinned to the building structure.

According to an aspect of at least one version of the disclosure, the methodology 200 may include determining a turn lane, which can further include one or more of accessing a digital map, a location of the vehicle, and a current trajectory of the vehicle, or receiving a user input indicative of a planned turn onto the turn lane. For example, the user input may be a route map based upon the digital map. Alternatively or in addition, the user input may be a turn signal. In some aspects where data supporting determination of a turn lane is conflicting (e.g., route data indicates a left turn, but the driver has activated a right turn signal, etc.), yielding indication can be provided for each possible turn lane. In other such aspects, however, a determination can be made of a more likely turn lane based on a first set of information being more relevant than a second set (e.g., turn signal activation may be regarded as more relevant than route map information, or vice versa, vehicle speed and proximity can be regarded as more relevant than turn signal information, or vice versa, etc.), and yielding indication can be provided for less than all possible turn lanes (where, as discussed above, "turn lanes" can include lanes that continue straight, etc.). In further aspects, machine learning (e.g., classifiers, etc.) can be employed to determine most likely travel directions corresponding to conflicting or ambiguous inputs.

According to one aspect of at least one version of the disclosure, the methodology 200 may include detecting no pedestrian entering or in the crosswalk path subsequent to detecting the vehicle stopped in response to the yielding indication, and replacing the yielding indication with a success indication.

While, for purposes of simplicity of explanation, the one or more methodologies shown herein, e.g., in the form of a flow chart, are shown and described as a series of acts, it is to be understood and appreciated that the subject disclosure is not limited by the order of acts, as some acts may, in accordance with the disclosure, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the disclosure.

Figure 3:
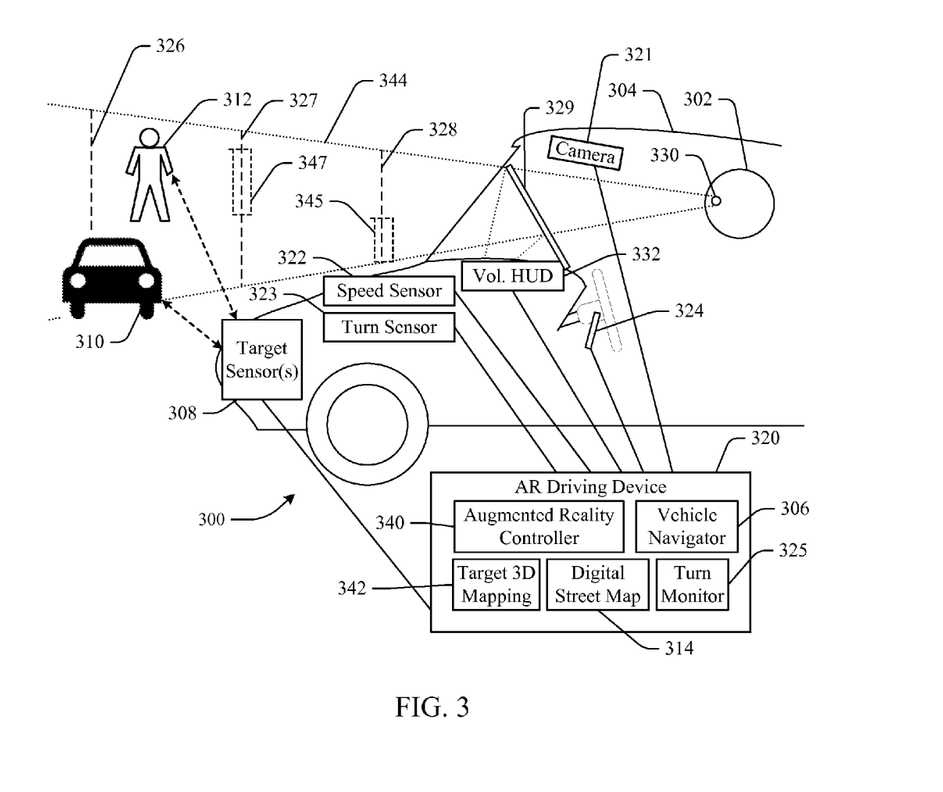
FIG. 3 illustrates a side view in cross section of a front portion of vehicle and a block diagram of an augmented reality driving system according to an example aspect of the disclosure.
Figure 4:
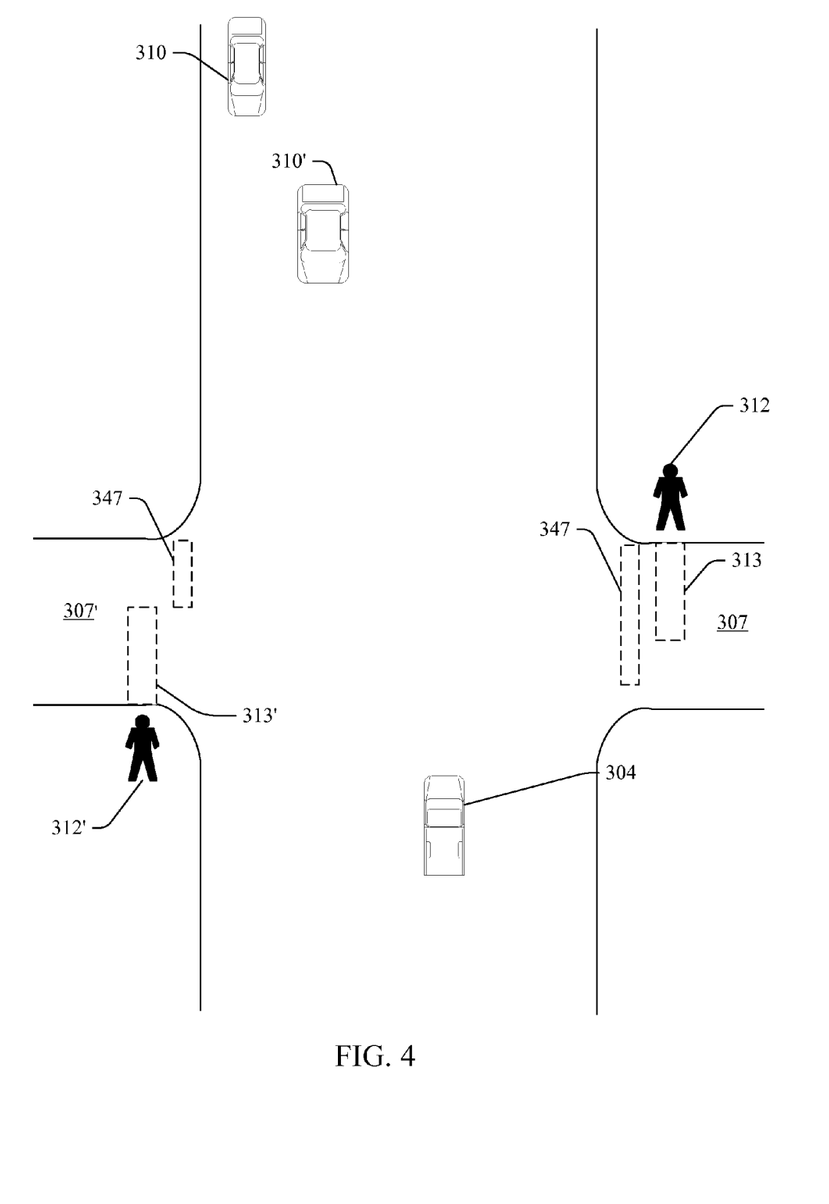
FIG. 4 illustrates a top view of a road with two illustrative instances of augmented reality for safely guiding pedestrian yielding in accordance with an aspect of the disclosure.
Figure 5:
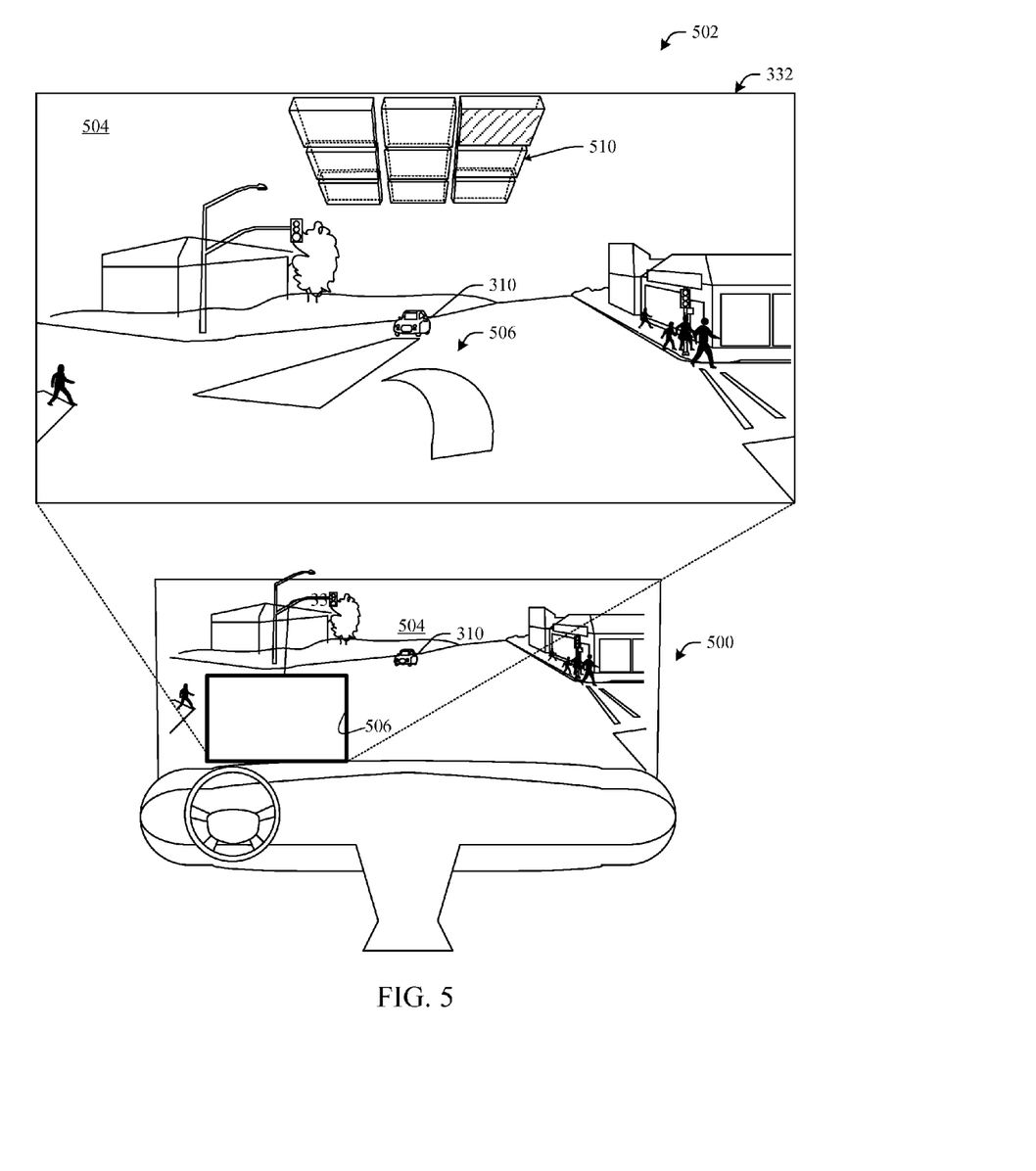
FIG. 5 illustrates a front view from a vantage point of a driver assisted by the augmented reality display in accordance with an aspect of the disclosure.

Referring now to FIGS. 3-5, an example augmented reality driver system 300 to safely guide a driver 302 of a vehicle 304 to yield to pedestrians in a crosswalk is depicted for clarity as a distributed system of several components carried by a vehicle 304; however, it will be appreciated with the benefit of the present disclosure that the functions may be integrated into one or more devices. In addition, certain functions or components may be remote to the vehicle 304.

With particular reference to FIG. 3, a vehicle navigator 306 detects a left turn based upon proximity and speed for the vehicle 304. The target sensor(s) 308 can also detect the presence or absence of, and potentially a location of a pedestrian 312 or 312'. Current position and proximity may be determined, for example, by accessing a digital street map 314 used by the vehicle navigator 306.

A vehicle navigator 306 determines a turn lane 307 or 307' (FIG. 4) based upon proximity to the vehicle 304. Target sensor(s) 308 may determine a current position and a relative vector for an oncoming vehicle 310 in a lane for opposing traffic that is approaching the left turn. Target sensor(s) 308 detect a pedestrian 312 or 312' entering the turn lane 307 or 307' and determine a crosswalk path 313 or 313' across the turn lane 307 or 307'.

An augmented reality (AR) driving device 320 is in communication with one or more sensors or controls in the vehicle 304, such as the target sensor(s) 308, a camera 321 for detecting driver head/eye position, vehicle speed sensor 322, a turn sensor 323, and a turn signal 324. For example, a turn monitor 325 of the AR driving device 320 may determine that a left turn is planned due to one or more user inputs such as an accepted route in the vehicle navigator 306, speed or steering inputs to the turn sensor 323, and actuation of the turn signal 324.

A volumetric heads up display (HUD) 332 is capable of projecting multiple focal planes 326-328 including a ground plane 329 with respect to a vantage point 330 of the driver 302.

Although not depicted, the volumetric HUD 332 may be employed in a simulated driving setup wherein synchronized video is projected onto the volumetric HUD 332, consisting only of the augmented computer graphic visuals. Seen together, designers or drivers in training can visualize a combined image. Displaying AR directly on the volumetric HUD 332 may achieve a higher level of fidelity than if overlaying the computer graphics directly on a driving scenery video.

An augmented reality controller 340 may have a target 3D mapping component 342 to three dimensionally map a forward view 344 including the pedestrian 312, and to spatially overlay an augmented reality display 345 on the volumetric heads up display 332 for a driver 302 of the vehicle 304 by projecting a yielding indication 347 adjacent to the crosswalk path 313 or 313'.

FIG. 4 depicts a first scenario for yielding to a pedestrian 312 that intends to cross a turn lane 307 to the right. For example, the crosswalk path 313 may be determined to be in an opposing direction. By contrast, for a second scenario of a pedestrian 312' at a turn lane 307' that is a left turn has a crosswalk path 313' that is crossing the other way.

With particular reference to FIG. 5, an interior portion 500 of the vehicle 304 as viewed by the driver 302 is depicted. The volumetric heads up display 332 creates an augmented reality display 502 of the unaltered front view 504 as well as an overlaid view 506 that appears to be at one or more focal planes. A safety grid 510 may also be depicted in the augmented relay display 502.

Figure 5A:
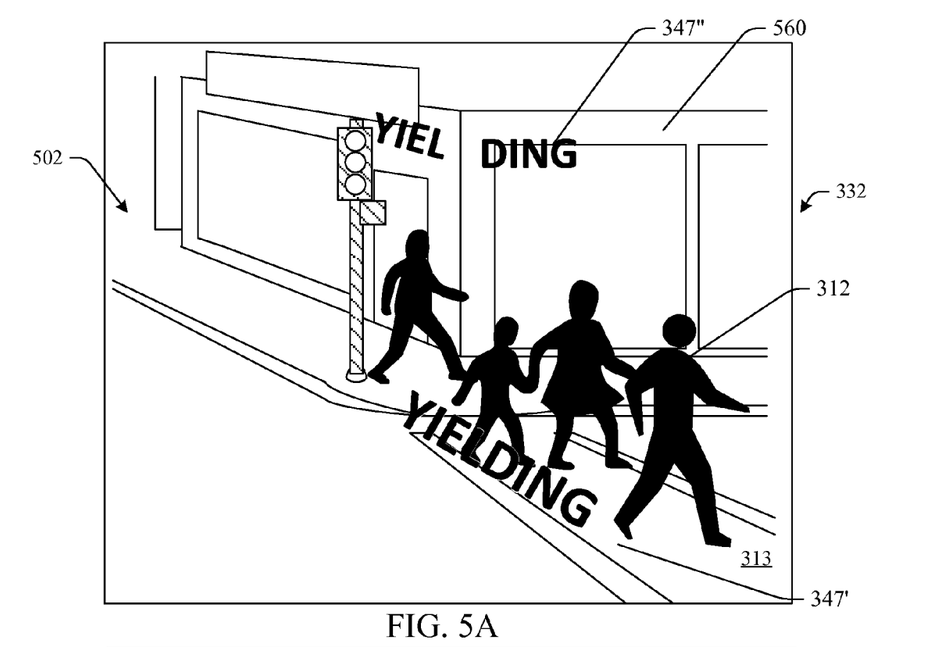
FIG. 5A illustrates two example pedestrian yielding indications of the augmented reality display of FIG. 5.

In FIG. 5A, the augmented reality display 502 projected on the volumetric HUD 332 is a yielding indication 347' (text "YIELDING," etc.) aligned as a barrier to the pedestrian 312 adjacent to the crosswalk path 313. In an alternative, the augmented reality display 502 projected on the volumetric HUD 332 is a yielding indication 347" (text "YIELDING," etc.) skinned to a building structure 560.

Figure 5B:
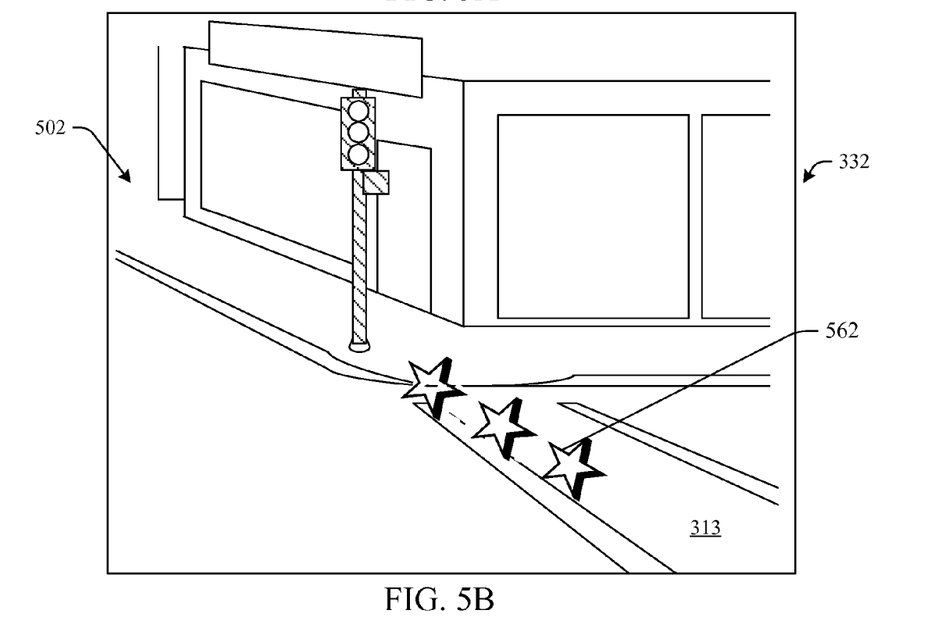
FIG. 5B illustrates a successful yielding indication subsequently included in the augmented reality display of FIG. 5.

In FIG. 5B, a success indication 562 is depicted in place of the yielding indication 347' subsequent to detecting the vehicle 304 stopped in response to the yielding indication 347'.

With the availability of heads-up displays (HUDs) combined with augmented reality (AR), the potential exists to alter the driver's perception of the road environment to improve safe driving behavior. An augmented reality display can project visual information into the driver's field of view, creating the possibility for a completely immersive experience. The driver's eyes can remain on the road, and information is presented in the same three dimensional, visual world as the driving situation, as opposed to voice or secondary displays. In such an AR environment, both suggested actions and immediate feedback of performance could be presented in context with the actual road scene and relevant objects in the scene, such as cars, lanes, or pedestrians. The present disclosure presents a model that describes what causes unsafe situations, such as distraction or aggressive driving, and using this same model. Additionally, the disclosure presents a strategy using visual positive feedback to engage and train the driver to adopt safer driving behavior while providing specialized visual guidance for various driving tasks.

Figure 6:
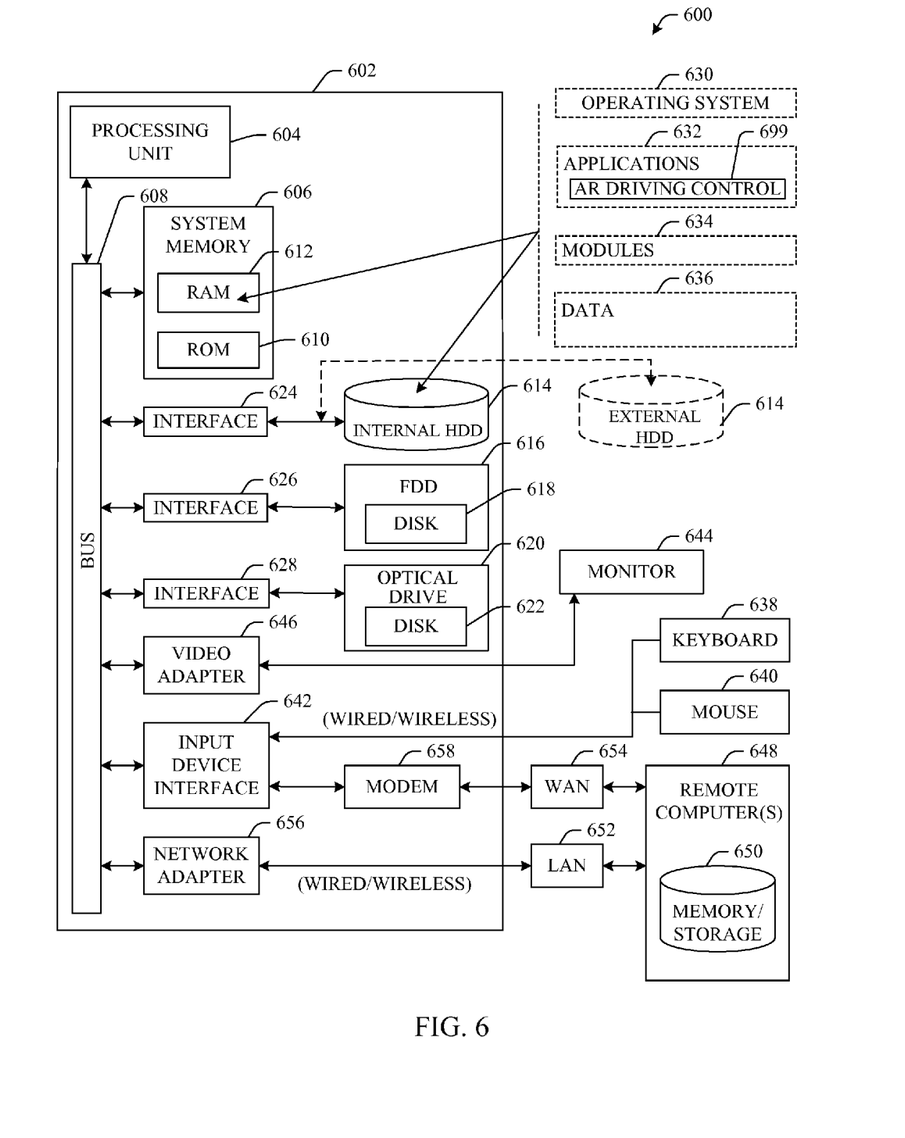
FIG. 6 illustrates a block diagram of a computer operable to execute the disclosed architecture in accordance with an aspect of the disclosure.

Referring now to FIG. 6, there is illustrated a block diagram of a computer operable to execute the disclosed architecture. In order to provide additional context for various aspects of the subject disclosure, FIG. 6 and the following discussion are intended to provide a brief, general description of a suitable computing environment 600 in which the various aspects of the disclosure can be implemented. While the disclosure has been described above in the general context of computer-executable instructions that may run on one or more computers, those skilled in the art will recognize that the disclosure also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the disclosure may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can include computer storage media and communication media. Computer storage media may include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CDROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 6, the example environment 600 for implementing various aspects of the disclosure includes a computer 602, the computer 602 including a processing unit 604, a system memory 606 and a system bus 608. The system bus 608 couples system components including, but not limited to, the system memory 606 to the processing unit 604. The processing unit 604 can be any of various commercially available processors. Dual microprocessors and other multiprocessor architectures may also be employed as the processing unit 604.

The system bus 608 can be any of several types of bus structure that may further interconnect to a memory bus (with or without a memory controller), a peripheral bus, and a local bus using any of a variety of commercially available bus architectures. The system memory 606 includes read-only memory (ROM) 610 and random access memory (RAM) 612. A basic input/output system (BIOS) is stored in a non-volatile memory 610 such as ROM, EPROM, EEPROM, which BIOS contains the basic routines that help to transfer information between elements within the computer 602, such as during start-up. The RAM 612 can also include a high-speed RAM such as static RAM for caching data.

The computer 602 further includes an internal hard disk drive (HDD) 614 (e.g., EIDE, SATA), which internal hard disk drive 614 may also be configured for external use in a suitable chassis (not shown), a magnetic floppy disk drive (FDD) 616, (e.g., to read from or write to a removable diskette 618) and an optical disk drive 620, (e.g., reading a CD-ROM disk 622 or, to read from or write to other high capacity optical media such as the DVD). The hard disk drive 614, magnetic disk drive 616 and optical disk drive 620 can be connected to the system bus 608 by a hard disk drive interface 624, a magnetic disk drive interface 626 and an optical drive interface 628, respectively. The interface 624 for external drive implementations includes at least one or both of Universal Serial Bus (USB) and IEEE 1394 interface technologies. Other external drive connection technologies are within contemplation of the subject disclosure.

The drives and their associated computer-readable media provide nonvolatile storage of data, data structures, computer-executable instructions, and so forth. For the computer 602, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the example operating environment, and further, that any such media may contain computer-executable instructions for performing the methods of the disclosure.

A number of program modules can be stored in the drives and RAM 612, including an operating system 630, one or more application programs 632, other program modules 634 and program data 636. All or portions of the operating system, applications, modules, and/or data can also be cached in the RAM 612. It is appreciated that the disclosure can be implemented with various commercially available operating systems or combinations of operating systems.

A user can enter commands and information into the computer 602 through one or more wired/wireless input devices, e.g., a keyboard 638 and a pointing device, such as a mouse 640. Other input devices (not shown) may include a microphone, an IR remote control, a joystick, a game pad, a stylus pen, touch screen, or the like. These and other input devices are often connected to the processing unit 604 through an input device interface 642 that is coupled to the system bus 608, but can be connected by other interfaces, such as a parallel port, an IEEE 1394 serial port, a game port, a USB port, an IR interface, etc.

A monitor 644 or other type of display device is also connected to the system bus 608 via an interface, such as a video adapter 646. In addition to the monitor 644, a computer typically includes other peripheral output devices (not shown), such as speakers, printers, etc.

The computer 602 may operate in a networked environment using logical connections via wired and/or wireless communications to one or more remote computers, such as a remote computer(s) 648. The remote computer(s) 648 can be a workstation, a server computer, a router, a personal computer, portable computer, microprocessor-based entertainment appliance, a peer device or other common network node, and typically includes many or all of the elements described relative to the computer 602, although, for purposes of brevity, only a memory/storage device 650 is illustrated. The logical connections depicted include wired/wireless connectivity to a local area network (LAN) 652 and/or larger networks, e.g., a wide area network (WAN) 654. Such LAN and WAN networking environments are commonplace in offices and companies, and facilitate enterprise-wide computer networks, such as intranets, all of which may connect to a global communications network, e.g., the Internet.

When used in a LAN networking environment, the computer 602 is connected to the local network 652 (within the vehicle 304 (FIG. 3) through a wired and/or wireless communication network interface or adapter 656. The adapter 656 may facilitate wired or wireless communication to the LAN 652, which may also include a wireless access point disposed thereon for communicating with the wireless adapter 656.

When used in a WAN networking environment, the computer 602 can include a modem 658, or is connected to a communications server on the WAN 654, or has other means for establishing communications over the WAN 654, such as by way of the Internet. The modem 658, which can be internal or external and a wired or wireless device, is connected to the system bus 608 via the serial port interface 642. In a networked environment, program modules depicted relative to the computer 602, or portions thereof, can be stored in the remote memory/storage device 650. It will be appreciated that the network connections shown are example and other means of establishing a communications link between the computers can be used.

The computer 602 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11(a, b, g, n, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The applications 632 may include an AR driving control 699 that performs certain operations as described herein, for example.

Figure 7:
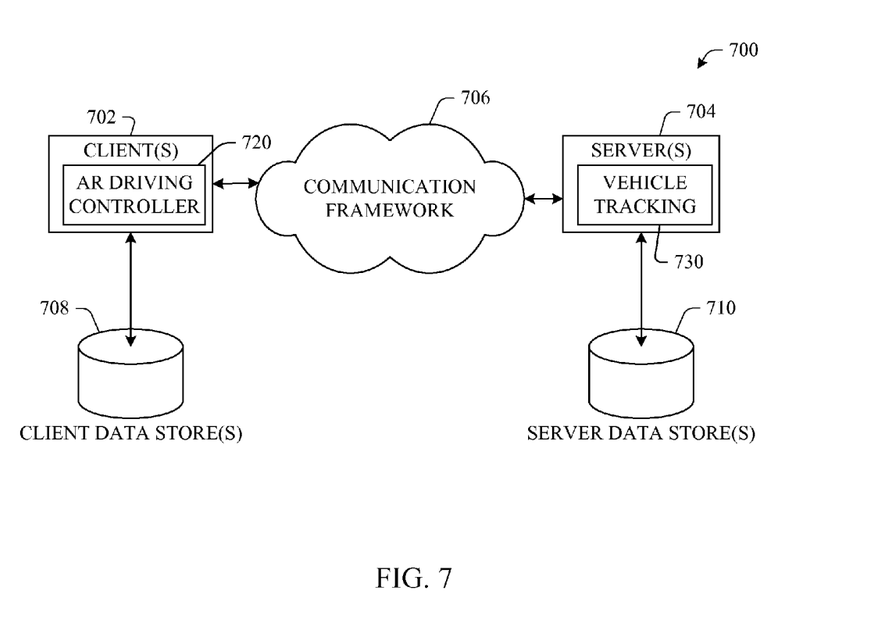
FIG. 7 illustrates a schematic block diagram of an example computing environment in accordance with the disclosure.

Referring now to FIG. 7, there is illustrated a schematic block diagram of an example computing environment 700 in accordance with the subject disclosure. The system 700 includes one or more client(s) 702. The client(s) 702 can be hardware and/or software (e.g., threads, processes, computing devices). The client(s) 702 can house cookie(s) and/or associated contextual information by employing the disclosure, for example.

The system 700 also includes one or more server(s) 704. The server(s) 704 can also be hardware and/or software (e.g., threads, processes, computing devices). The servers 704 can house threads to perform transformations by employing the disclosure, for example. One possible communication between a client 702 and a server 704 can be in the form of a data packet adapted to be transmitted between two or more computer processes. The data packet may include a cookie and/or associated contextual information, for example. The system 700 includes a communication framework 706 (e.g., a global communication network such as the Internet) that can be employed to facilitate communications between the client(s) 702 and the server(s) 704.

Communications can be facilitated via a wired (including optical fiber) and/or wireless technology. The client(s) 702 are operatively connected to one or more client data store(s) 708 that can be employed to store information local to the client(s) 702 (e.g., cookie(s) and/or associated contextual information). Similarly, the server(s) 704 are operatively connected to one or more server data store(s) 710 that can be employed to store information local to the servers 704.

For example, the client(s) 702 may locally host an AR driving controller 720 that performs certain operations described herein that cooperates with a vehicle tracking instance 730 that is hosted on server(s) 704 that performs certain other operations described herein.

What has been described above includes examples of the disclosure. It is, of course, not possible to describe every conceivable combination of components or methodologies for purposes of describing the subject disclosure, but one of ordinary skill in the art may recognize that many further combinations and permutations of the disclosure are possible. Accordingly, the disclosure is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

By benefit of the foregoing, it should be appreciated that a query component that generally includes a rule engine component and a rule evaluation component may be used for performing one or more of the operations described herein. In accordance with this alternate aspect, an implementation scheme (e.g., rule) can be applied to define and/or implement a query. It will be appreciated that the rule-based implementation can automatically and/or dynamically define and implement a query of a data store. In response thereto, the rule-based implementation can select data component(s) included within the result(s) by employing a predefined and/or programmed rule(s) based upon any desired criteria (e.g., file type, file size, hardware characteristics).

By way of example, a user can establish a rule that can implement a query of a preferred type of file (e.g., route). Thereby, a user input may be inferred, planned or otherwise pre-determined. In this example aspect, the rule can be constructed to select all route files from a targeted data store or source location. Accordingly, a result set of data components can be obtained, previewed and/or manipulated as desired. Once finalized, a container (e.g., dynamic list) can be generated and stored in a desired location and/or device. It will be appreciated that any of the specifications utilized in accordance with the subject disclosure can be programmed into a rule-based implementation scheme.

In the example aspect, the rule engine component can be programmed or configured in accordance with a user-defined preference. As well, a rule can be established in accordance with a specific hardware configuration or in accordance with a software application. For example, a rule can be constructed in accordance with specific memory capacity and/or display of a device. In other words, as previously discussed, a rule can be established to take into consideration the specific limitations of a hardware device (e.g., display mechanism).

The rule evaluation component facilitates application of the rule. Based upon the output of the rule evaluation component, the query component can return the results thus effecting establishment of appropriate associations by the dynamic list component as discussed supra.

Certain components that perform operations described herein may employ an artificial intelligence (AI) component which facilitates automating one or more features in accordance with the subject disclosure. A classifier is a function that maps an input attribute vector, $x=(x_1, x_2, x_3, x_4, x_n)$, to a confidence that the input belongs to a class, that is, $f(x)$ =confidence(class). Such classification can employ a probabilistic and/or statistical-based analysis (e.g., factoring into the analysis utilities and costs) to prognose or infer an action that a user desires to be automatically performed.

A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject disclosure can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically learn and perform a number of functions, including but not limited to determining according to a predetermined criteria.

What is claimed is:

1. A method for safely guiding a vehicle driver to yield to a pedestrian, comprising:
   determining a turn lane based upon a proximity of a vehicle to the turn lane prior to the vehicle entering the turn lane;
   detecting a pedestrian entering the turn lane;
   three dimensionally mapping a forward view including the pedestrian and the turn lane; and
   spatially overlaying an augmented reality display on a volumetric heads up display for the vehicle driver comprising projecting a yielding indication adjacent to a determined crosswalk path across the turn lane.

2. The method of claim 1, comprising projecting the yielding indication aligned as a barrier to the pedestrian adjacent to the crosswalk path.

3. The method of claim 1, comprising:
   detecting a building structure adjacent to the pedestrian entering the turn lane;
   three dimensionally mapping the building structure in the forward view; and
   overlaying the augmented reality display with the yielding indication that is skinned to the building structure.

4. The method of claim 1, wherein determining the turn lane comprises:
   accessing a digital map, a location of the vehicle, and a current trajectory of the vehicle; and
   receiving a user input indicative of a planned turn onto the turn lane.

5. The method of claim 4, further comprising receiving the user input indicative of the planned turn by receiving a route map based upon the digital map.

6. The method of claim 4, further comprising receiving the user input indicative of the planned turn by receiving a turn signal.

7. The method of claim 1, further comprising:
   detecting an absence of pedestrians entering or in the crosswalk path subsequent to detecting the vehicle stopped in response to the yielding indication; and
   replacing the yielding indication with a success indication.

8. An augmented reality driver system for safely guiding a vehicle driver to yield to pedestrians, comprising:
   a vehicle navigator to determine a turn lane based upon a proximity to of a vehicle to the turn lane;
   a target sensor to detect a pedestrian entering the turn lane and to determine a crosswalk path across the turn lane;
   a volumetric heads up display; and
   an augmented reality controller to three dimensionally map a forward view including the pedestrian and the turn lane, and to spatially overlay an augmented reality display on the volumetric heads up display for the vehicle driver by projecting a yielding indication adjacent to the crosswalk path.

9. The augmented reality driver system of claim 8, wherein the augmented reality controller projects the yielding indication aligned as a barrier to the pedestrian adjacent to the crosswalk path.

10. The augmented reality driver system of claim 8, wherein the target sensor detects a building structure adjacent to the pedestrian entering the turn lane; and
   wherein the augmented reality controller three dimensionally maps the building structure in the forward view, and to overlay the augmented reality display with the yielding indication that is skinned to the building structure.

11. The augmented reality driver system of claim 8, wherein the vehicle navigator determines the turn lane by:
   accessing a digital map, a location of the vehicle, and a current trajectory of the vehicle; and
   receiving a user input indicative of a planned turn onto the turn lane.

12. The augmented reality driver system of claim 11, wherein the vehicle navigator receives the user input indicative of the planned turn by receiving a route map based upon the digital map.

13. The augmented reality driver system of claim 11, wherein the vehicle navigator receives the user input indicative of the planned turn by receiving a turn signal.

14. The augmented reality driver system of claim 8, wherein the target sensor detects an absence of pedestrians entering or in the crosswalk path; and
   wherein the augmented reality controller replaces the yielding indication with a success indication subsequent to detecting the vehicle stopped in response to the yielding indication.

15. A device for safely guiding a vehicle driver to yield to pedestrians, comprising:
   a volumetric heads up display; and
   a controller in communication with the volumetric heads up display, wherein the controller comprises at least one processor that executes software instructions to perform operations comprising:
      determining a turn lane based upon proximity of a vehicle to the turn lane before the vehicle enters the turn lane,
      detecting a pedestrian entering the turn lane and determining a crosswalk path across the turn lane,
      three dimensionally mapping a forward view including the pedestrian and the turn lane, and
      spatially overlaying an augmented reality display on a volumetric heads up display for the vehicle driver by projecting a yielding indication adjacent to the crosswalk path.

16. The device of claim 15, wherein the controller performs operations that comprise projecting the yielding indication aligned as a barrier to the pedestrian adjacent to the crosswalk path.

17. The device of claim 15, wherein the controller performs operations that comprise:
   detecting a building structure adjacent to the pedestrian entering the turn lane;
   three dimensionally mapping the building structure in the forward view; and
   overlaying the augmented reality display with the yielding indication that is skinned to the building structure.

18. The device of claim 15, wherein the controller performs operations that comprise:
   accessing a digital map, a location of the vehicle, and a current trajectory of the vehicle; and
   receiving a user input indicative of a planned turn onto the turn lane.

19. The device of claim 18, wherein the controller receives the user input indicative of the planned turn by receiving a route map based upon the digital map.

20. The device of claim 18, wherein the controller performs operations that comprise receiving the user input indicative of the planned turn by receiving a turn signal.

* * * * *